United States Patent [19]

Dumbrill et al.

[11] Patent Number: 5,742,911
[45] Date of Patent: Apr. 21, 1998

[54] SECTORIZED CELLULAR RADIO BASE STATION ANTENNA

[75] Inventors: Michael James Dumbrill, Swindon; Idris John Mark Rees, Hungerford, both of United Kingdom

[73] Assignee: Motorola, Inc., Schaumburg, Ill.

[21] Appl. No.: 658,985

[22] Filed: Jun. 4, 1996

Related U.S. Application Data

[63] Continuation of Ser. No. 130,603, Oct. 1, 1993, abandoned.

[30] Foreign Application Priority Data

Oct. 3, 1992 [GB] United Kingdom .................. 9220823

[51] Int. Cl.⁶ ..................................................... H04Q 7/30
[52] U.S. Cl. ........................................ 455/562; 455/422
[58] Field of Search ........................... 455/33.3, 33.4, 455/52.3, 54.1, 65, 273, 277.1, 277.2, 562, 504, 506, 517; 379/59, 60

[56] References Cited

U.S. PATENT DOCUMENTS

| | | | |
|---|---|---|---|
| 4,369,520 | 1/1983 | Cerny, Jr. et al. | 455/33.3 |
| 4,597,105 | 6/1986 | Freeburg | 455/33 |
| 4,639,914 | 1/1987 | Winters | 455/33.3 X |
| 4,727,590 | 2/1988 | Kawano et al. | 455/33 |
| 4,845,504 | 7/1989 | Roberts et al. | 342/457 |
| 5,119,501 | 6/1992 | Perr et al. | 455/33.3 |
| 5,276,907 | 1/1994 | Meidan | 455/33.3 |

Primary Examiner—Edward F. Urban
Attorney, Agent, or Firm—Richard A. Sonnentag

[57] ABSTRACT

A sectorized cellular radio base station antenna is provided comprising: a plurality (e.g. six) of angularly separated directional transmit antennas (11), each transmit antenna having a central access of transmission, for serving mobile units located in sectors centered on the axis of transmission of the transmit antennas; a plurality (e.g. six) of angularly separated directional receive antennas (30), each having a central axis of reception; and diversity combining means for combining signals from adjacent receive antennas. The central axis of the receiving antennas are at an angular offset to the central axis of the transmit antennas and, for a mobile in a given sector served by a given transmit antenna, the diversity combining means are arranged to combine the signals from the two receive antennas the axes of which lie on either side of that transmit antenna axis.

15 Claims, 4 Drawing Sheets

SECTORIZED CELLULAR RADIO BASE STATION ANTENNA

This is a continuation of application Ser. No. 08/130,603, filed Oct. 1, 1993, and now abandoned.

FIELD OF THE INVENTION

This invention relates to sectorized cellular radio base station antennas and in particular it concerns the radio technique known as "antenna space diversity". The invention can be utilized in many radio systems, but is particularly applicable to the digital Groupe Speciale Mobile (GSM) digital European cellular radio system.

BACKGROUND OF THE INVENTION

Radio links between mobile stations and base stations must tolerate multipath signals which are reflected off buildings and other objects. In general, the received signal is the vector sum of a number of delayed signals returned via a number of transmissions paths. The signal at the receive antenna shows the results of this multipath reception as constructive and destructive interference as the stations move, and the signal exhibits random deep fades causing dropouts in the received signal.

Antenna Space Diversity is a technique used which employs two receive antennas which are separated spatially so that the fades received at the antennas are uncorrelated. The signals from these two antennas are then processed in a combining/selecting device to give improved receive performance over that achievable with one antenna. A simple example of this method is to select the signal from the receiver with the strongest received signal, although, other combining methods are possible.

A typical prior art six sector cell site is illustrated in FIG. 1. There is a single antenna transmitting and receiving in each 60° sector labelled sector A to sector F.

FIG. 1 illustrates an idealized situation in which the coverage of the antennas matches the sectors exactly. In reality, the coverage of each antenna overlaps the sector boundary. This is illustrated in FIG. 2 where the shaded region 10 represents the approximate coverage of the antenna 11 of sector A.

A commonly used diversity arrangement is that of providing two receiving antennas separated spatially by a distance of a number of wavelengths in each sector. The antennas may be separated horizontally or vertically. The arrangement provides that the two receive antennas are then combined/selected to implement diversity reception. This method requires a total of twelve receive antennas to implement a six sector site.

Another method which is implemented with the Total Access Communications System (TACS) uses the overlapping of the antennas from adjacent sectors to reduce the number of antennas required for a six sector site to a total of six. This requires the receive antennas to be spatially separated by a number of wavelengths—which is normally the case on a standard site. Whilst in sector A the receive path in sectors B and F can be monitored and if found to be better than the receive path in sector A, the appropriate antenna can be switched into the receiver in preference to the antenna for sector A. It can be seen that this scheme would enhance the performance of the radio transmission.

One implementation difficulty with this scheme is that the receiver must now use one main receive antenna and choose between two other antennas, making a total of three receive antennas possible for each sector. This selection may be achieved, in the TACS system, using a scan receiver as shown in FIG. 3. The scan receiver 12 measures the average signal level on receive antennas B and F and the antenna with the larger signal is used with the main antenna A to feed the diversity receiver 13.

Unfortunately, there are considerable practical difficulties inherent in the implementation of this shared diversity scheme when translated to the GSM system. In a GSM system it is inconvenient to provide a scan receiver and there is a need for alternative arrangement for selecting the correct antenna pair.

Consider a mobile in sector A trying to establish a call to the base station in the cell. The mobile will send a channel request which will be received on the antenna in sector A. At this stage there is no mechanism for knowing whether antenna B or antenna F is the best candidate for the second antenna to be used in the diversity algorithm, so the best that can be done is to choose one at random (for example always favouring the antennas in the clockwise direction). With such a scheme there is a fair chance that no gain in performance will be achieved in the performance of the RACh (Random Access Channel) from the diversity over the no-diversity case.

Even when a TCh (Traffic Channel) or SDCCh (Standalone Dedicated Control Channel) has been established, there are practical difficulties with the shared diversity algorithm because, whilst in sector A, both the receive paths from sectors B and F must be monitored to ensure that the best antennas for the diversity algorithm are utilised. Thus, for instance if at one time antennas A and F were being used to achieve shared diversity, then periodically antenna B would have to be monitored to establish whether it has a better receive path than antenna F. If it did then antenna B would be switched in rather than antenna F.

This continuous switching and monitoring causes a prohibitively large overhead in complexity. Also, during the time in which the sampling of antennas is taking place the performance of the receiver is not optimised.

SUMMARY OF THE INVENTION

According to the invention, a sectorized cellular radio base station antenna is provided comprising:

a plurality of angularly separated directional transmit antennas, each transmit antenna having a central axis of transmission, for serving mobile units located in sectors centred on the axis of transmission of the transmit antennas;

a plurality of angularly separated directional receive antennas, each having a central axis of reception; and diversity combining means for combining signals from adjacent receive antennas;

characterized in that the central axis of the receiving antennas are at an angular offset to the central axis of the transmit antennas and, for a mobile in a given sector served by a given transmit antenna, the diversity combining means are arranged to combine the signals from the two receive antennas the axes of which lie on either side of that transmit antenna axis.

It will be understood that the expression "combined" extends to selection, equal gain combining and maximum ratio combining.

By offsetting or rotating the receive antennas by an angle, for example 30°, to the transmit antennas, the necessity of choosing between candidates for the second antenna to be used for diversity is avoided. This provides for simplicity and efficiency.

It is preferred that each receive antenna has an area of reception overlapping substantially half of the area of reception of each adjacent receive antenna. In this way, a signal from any point in the cell can be received clearly at two antennas. Moreover, it is preferred that the central axis of each receive antenna approximately bisects the angle between the central axis of two adjacent transmit antennas (and the central axis of each transmit antenna approximately bisects the angle between the central axis of two adjacent receive antennas). With this combination of features, the area of overlap of two receive antennas extends across a complete sector served by the transmit antenna.

The invention can be extended to diversity in transmission, with two adjacent transmit antennas serving a sector centred on a given receive antenna.

Preferred embodiments of the invention will now be described, by way of example only, with reference to the accompanying drawings.

DETAILED DESCRIPTION OF THE PREFERRED EMBODIMENTS

Figure 1:
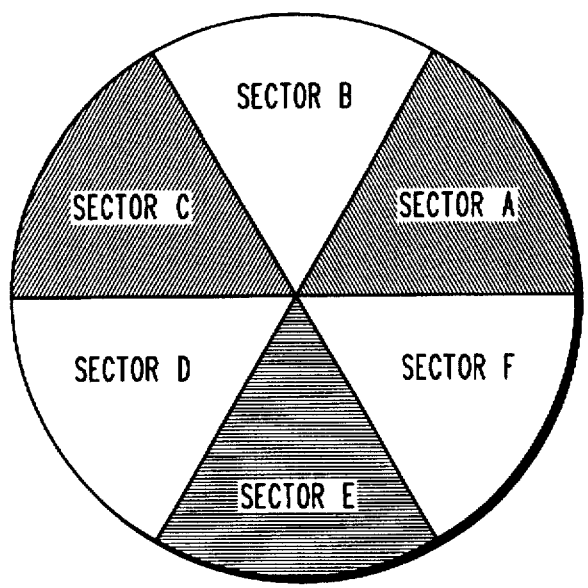
FIG. 1 is a diagrammatical representation of a six sector cell.
Figure 2:
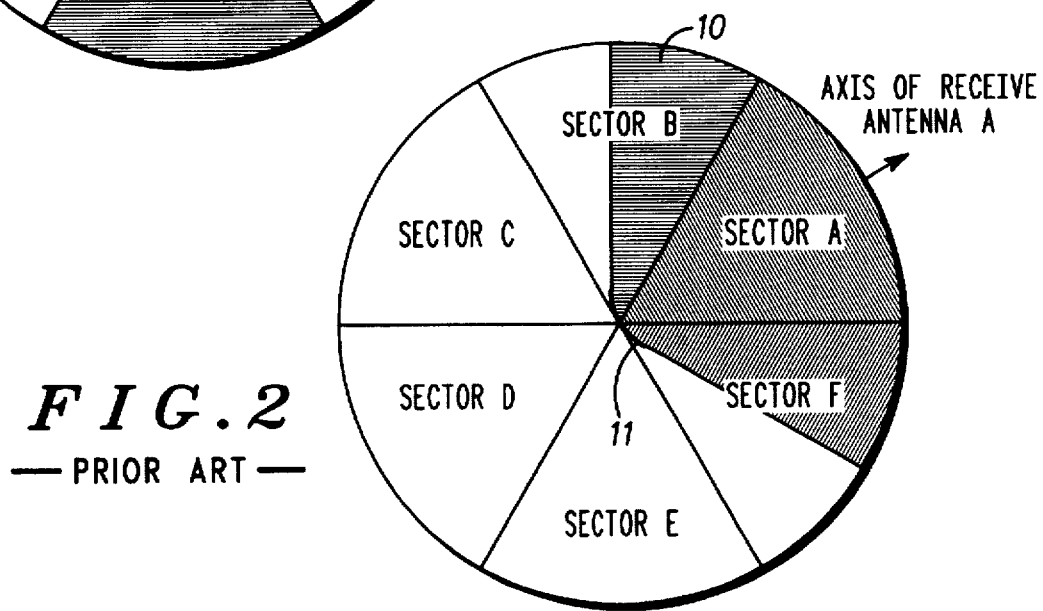
FIG. 2 is a diagrammatic representation of the cell of FIG. 1 and the receive area of a receive antenna in accordance with the prior art.
Figure 3:
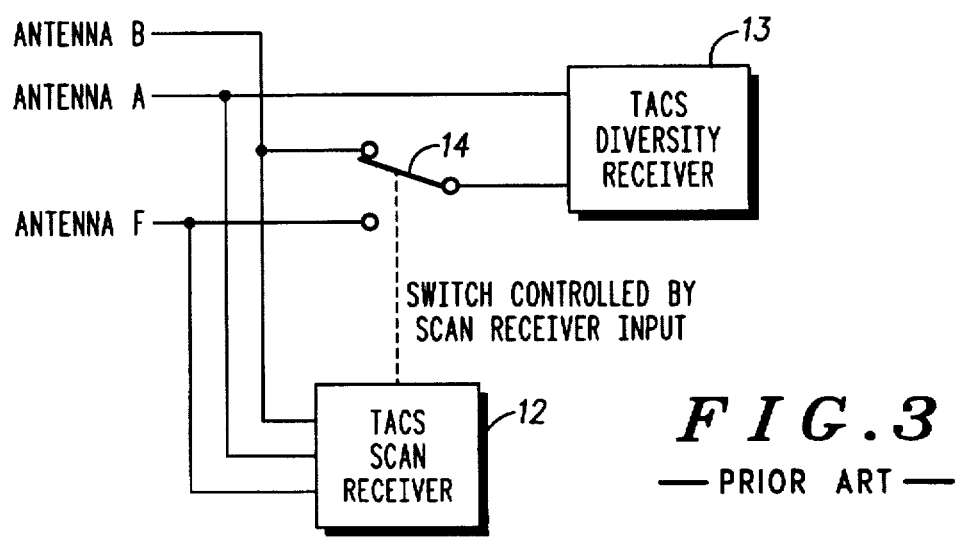
FIG. 3 is a diagrammatic representation of a diversity receiver in accordance with the prior art.
Figure 4:
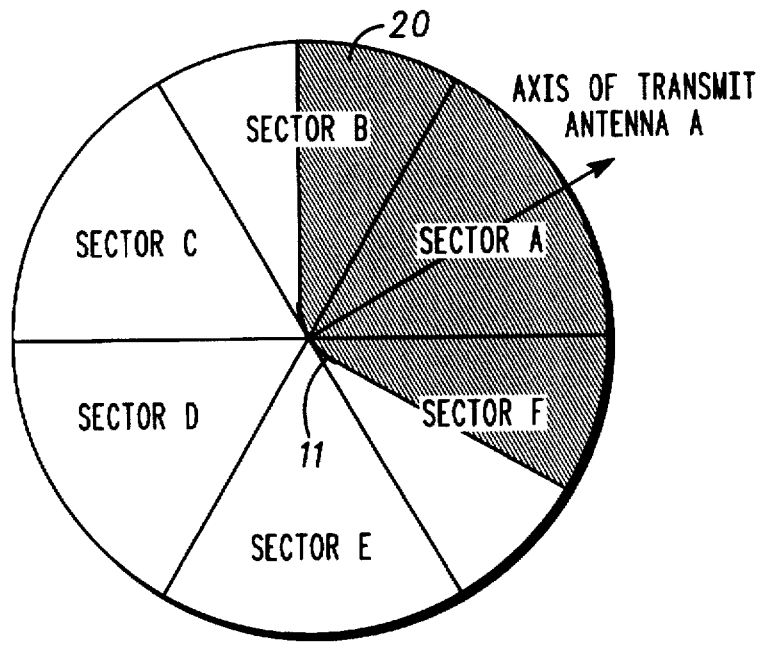
FIG. 4 is a diagrammatic representation of a cell and the transmission area of a transmit antenna according to a preferred embodiment of the invention.

Referring to FIG. 4, a six-sector cell is illustrated and the shaded area 20 represents the area of coverage of a transmit antenna designated transmit antenna A having its central axis of transmission in the centre of sector A. The angle of coverage of the antenna is approximately 120° such that approximately half of sector B and half of sector F are covered by transmit antenna A. Each of the other six sectors B–F has a corresponding transmit antenna having a 120° angle. Every point on the circle is covered by two transmit antennas, although this is incidental to the preferred embodiment of the present invention.

Figure 5:
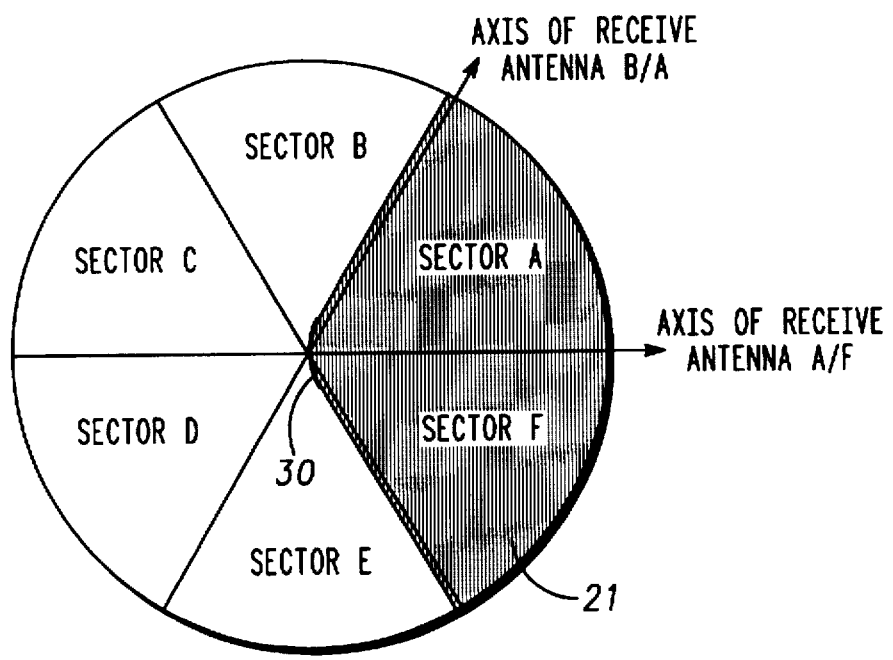
FIG. 5 is a diagrammatic representation of the cell of FIG. 4 and the area of coverage of a receive antenna according to the preferred embodiment of the invention.

Referring to FIG. 5, the same cell is shown as is shown in FIG. 4 and the shaded area 21 represents the area of reception of one receive antenna 30 designated antenna A/F. The receive antenna has an area of coverage of approximately 120° and its central axis of reception is directed along the nominal boundary between sector A and sector F. This boundary is described as "nominal" because it has no physical attribute. Another five receive antennas are provided having their central axes centred over the other five nominal boundaries between the various cells. Thus, the receive antennas are distributed at 60° intervals, which intervals are off set from the corresponding central axis of the transmit antennas of FIG. 4 by a constant offset of 30°. It will be appreciated that one "sector" is now fully covered by one transmit antenna and two receive antennas. (From the point of view of transmission diversity, if implemented, one "sector" can be considered to be fully covered by two transmit antennas and one receive antenna).

Figure 6:
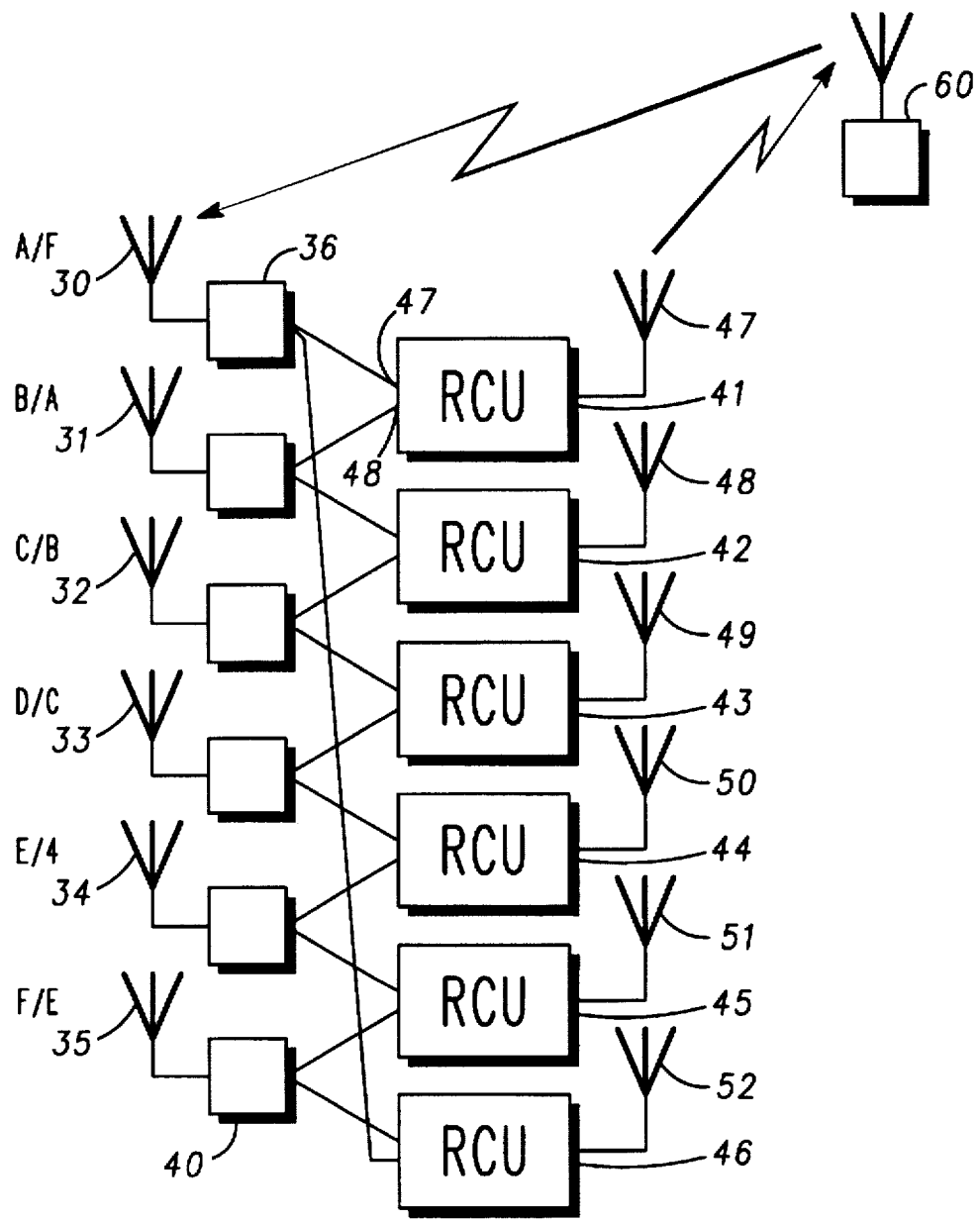
FIG. 6 is a block diagram representing the receive circuitry of a GSM base station according to a first embodiment of the invention.

Referring now to FIG. 6, the six receive antennas of FIG. 5 are shown numbered 30–35. Each is connected to a splitter 36–40, each of which splits the received signal to a different radio channel unit (RCU) 41–46. Each of the RCUs 41–46 is an individual two-port diversity receive unit available from Motorola European Cellular Infrastructure Division, 16 Euro Way, Blagrove, Swindon, Wiltshire, SM5 8YW. RCUs are available from the above address in complete base station cabinets, four RCUs to a cabinet together with corresponding circuitry for four transmit antennas. The cabinets are available under model number BTS-4D. Thus, the entire circuitry of FIG. 6 can be assembled from two BTS-4D cabinets with two surplus RCUs which may be used for redundancy in the event of RCU failures.

Each RCU has two ports, shown as ports 47 and 48 in the case of RCU 41. In a prior art arrangement, each of these ports would either receive a signal from its own separate antenna (requiring twelve receive antennas in total) or from a selection matrix where the first port 47 is connected to its dedicated antenna and the second port 48 is capable of receiving its signal selectively from a splitter of one of the adjacent antennas. By contrast, the arrangement of FIG. 6 is somewhat simplified in that the port 48 is permanently connected to the splitter of the adjacent antenna.

Each radio channel unit 41–46 is also connected, to a transmit antennas 49–54. The transmit antennas 49–54 are all at 30° offsets to the receive antennas 30–35.

When a call is set up to a mobile 60 located, for example, in sector A, the call is set up through transmit antenna 47 and is simultaneously received through receive antennas 30 and 31. The received signal passes through splitters 36 and 37 to ports 47 and 48 of RCU 41. Thus, the outgoing and incoming paths of the same call pass through the same RCU and for each transmit sector there are always two receive antennas connected to the RCU for that transmit sector.

Figure 7:
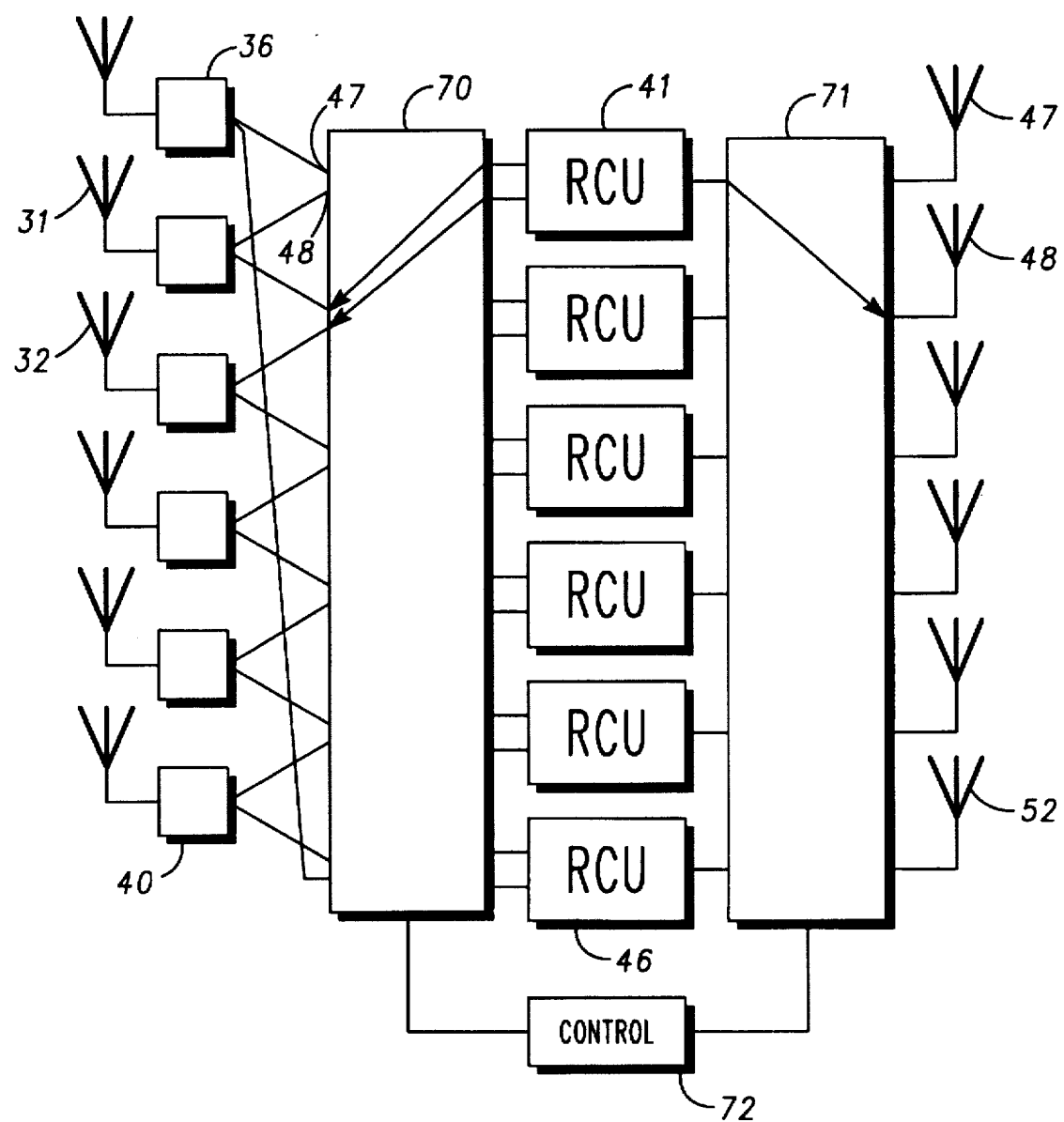
FIG. 7 is a block diagram of the receive circuitry of a GSM base station according to a second embodiment of the invention.

FIG. 7 shows an arrangement which is alternative to that of FIG. 6, where the further feature of dynamic allocation of the RCUs is provided. In FIG. 7, in addition to the elements shown in FIG. 6, there are switch matrices 70 and 71 on the receive and transmit sides respectively. The transmit matrix 70 connects the splitters 36–40 to the input ports of the RCUs 41–46. The switch matrix 71 connects the transmit outputs of the RCUs 41–46 to the transmit antennas 47–52.

Switch matrices 70 and 71 simultaneously switch the receive ports and the transmit port of any RCU (for example RCU 41) to any pair of receive antennas (e.g. antennas 31 and 32 as shown) via their respective splitters and to the corresponding transmit antenna (e.g. transmit antenna 48). In this way any RCU can be dynamically allocated to any sector of the cell in a given time slot. The switch matrices 70 and 71 can switch on a slot-by-slot basis. The arrangement has various advantages over that shown in FIG. 6, including that of allowing the sharing of operational RCUs in the event of failure of another RCU. It should be noted that the switching of an RCU to a particular sector is not dependent on any signal strength or diversity decision, but on other factors. The pair of receive antennas to which the two diversity receive ports of an RCU are connected always cover the sector of the cell corresponding to the transmit antenna to which the transmit port is connected.

The RCUs 41–46 are, in the cases of the arrangements of FIG. 6 and FIG. 7, connected to a CEPT 2Mbit/s interface linking the base station to a mobile switching centre. These details are not shown in the figures but can be found in UK patent application No. 9110258.

We claim:

1. A sectorized cellular radio base station antenna comprising:

a plurality of angularly separated directional transmit antennas, each transmit antenna providing a transmit coverage sector having a central axis of transmission, for transmitting signals to mobile units located in said transmit coverage sector;

a plurality of angularly separated directional receive antennas, each receive antenna providing a receive coverage sector having a central axis of reception, for receiving signals from mobile units located in said receive coverage area; and diversity combining means for combining signals from adjacent receive antennas; wherein said central axes of said receive antennas are angularly offset to said central axes of said transmit antennas, and said transmit coverage sectors and said receive coverage sectors have substantially similar angular coverage but are angularly offset, so that, for a mobile in a given transmit coverage sector, said diversity combining means is arranged to diversity combine said received signals from two of said receive antennas the axes of which lie on either side of that transmit antenna axis.

2. An antenna according to claim 1, wherein each transmit coverage sector substantially overlaps half of each adjacent transmit coverage sector.

3. An antenna according to claim 1, wherein each receive coverage sector substantially overlaps half of each adjacent receive coverage sector.

4. An antenna according to claim 1, wherein the central axis of each receive antenna approximately bisects the angle between the central axes of two adjacent transmit antennas.

5. An antenna according to claim 1, wherein the diversity combining means are arranged to select the signal of greater strength from the signals from the two receive antennas.

6. An antenna according to claim 1, wherein the diversity combining means is maximum ratio diversity combining means for combining the signals from the two antennas in weighted proportions.

7. An antenna according to claim 1 further comprising six transmit antennas at evenly distributed angles around the base station and six receive antennas at evenly distributed angles around the base station.

8. A base station comprising:

a sectorized antenna having:

a plurality of angularly separated directional transmit antennas, each transmit antenna providing a transmit coverage sector having a central axis of transmission, for transmitting signals to mobile units located in said transmit coverage sector;

a plurality of angularly separated directional receive antennas, each receive antenna providing a receive coverage sector having a central axis of reception, for receiving signals from mobile units located in said receive coverage area wherein said central axes of said receive antennas are angularly offset to said central axes of said transmit antennas, and said transmit coverage sectors and said receive coverage sectors have substantially similar angular coverage but are angularly offset;

diversity combining means for combining signals from adjacent receive antennas, wherein, for a mobile in a given transmit coverage sector served by a given transmit antenna, said diversity combining means is arranged to diversity combine said received signals from two of said receive antennas the axes of which lie on either side of that transmit antenna axis;

a plurality of radio transceivers, each having first and second diversity receive ports and a plurality of splitter means, each splitter means connecting one receive antenna to diversity receive ports of two transceivers.

9. A base station according to claim 8, further comprising switching means connecting the splitters to the transceivers and connecting the transceivers to the transmit antennas, and control means for selectively connecting a transceiver simultaneously to:

(a) a transmit antenna and (b) a splitter connected to the two receive antennas the axes of which lie on either side of the axis of that transmit antenna.

10. A sectorized cellular radio base station antenna comprising:

a plurality of angularly separated directional receive antennas, each receive antenna having a central axis of reception, for serving mobile units located in sectors centered on the axes of reception of the receive antennas;

a plurality of angularly separated directional transmit antennas, each having a central axis of transmission; and splitter means for splitting transmit signals to adjacent transmit antennas wherein the central axes of the transmit antennas are at an angular offset to the central axes of the receive antennas and, for a mobile in a given sector served by a given receive antenna, the splitter means is arranged to pass a transmit signal to two transmit antennas, the axes of which lie on either side of that receive antenna axis.

11. An antenna according to claim 10, wherein each receive coverage sector substantially overlaps half of each adjacent receive coverage sector.

12. An antenna according to claim 10, wherein each transmit coverage sector substantially overlaps half of each adjacent transmit coverage sector.

13. An antenna according to claim 10, wherein the central axis of each receive antenna approximately bisects the angle between the central axes of two adjacent transmit antennas.

14. An antenna according to claim 10, further comprising six transmit antennas at evenly distributed angles around the base station and six receive antennas at evenly distributed angles around the base station.

15. A sectorized cellular radio base station antenna comprising:

a directional transmit antenna for transmitting signals to mobile units substantially within a corresponding transmit coverage sector, the transmit coverage sector having a central axis of transmission;

first and second adjacent directional receive antennas for receiving signals from mobile units substantially within corresponding first and second adjacent receive coverage sectors, each of the first and second receive coverage sectors having a central axis of reception and being substantially similar to the transmit coverage sector; and diversity combining means for combining signals transmitted by mobile units and received by the first and second adjacent receive antennas; wherein said central axis of said transmit antenna is substantially aligned with a boundary between the adjacent receive coverage sectors to create a coverage overlap region between the transmit coverage sector and a portion of each of the adjacent receive coverage sectors, so that a mobile unit located substantially within the coverage overlap region has its transmission received by the first and second adjacent receive antennas and diversity combined by the diversity combining means.

* * * * *